United States Patent [19]

Funabashi

[11] Patent Number: 4,537,273
[45] Date of Patent: Aug. 27, 1985

[54] RADIATOR SYSTEM FOR MOTORCYCLE

[75] Inventor: Katsunori Funabashi, Saitama, Japan

[73] Assignee: Honda Giken Kogyo Kabushiki Kaisha, Tokyo, Japan

[21] Appl. No.: 496,127

[22] Filed: May 19, 1983

[30] Foreign Application Priority Data

May 24, 1982 [JP] Japan .................... 57-87789

[51] Int. Cl.³ .............................................. B60K 11/04
[52] U.S. Cl. .................................. 180/229; 180/68.6; 220/86 R
[58] Field of Search ..................... 180/229, 68.6, 68.4; 165/41; 220/86 R, 85 F, 86 AT; 280/202, 289 A

[56] References Cited

U.S. PATENT DOCUMENTS 2,051,823 11/1935 Clarke ............................ 280/202 X
3,926,274 12/1975 Morioka et al. ...................... 180/35
4,478,306 10/1984 Tagami ............................... 180/229

FOREIGN PATENT DOCUMENTS 53-25049   3/1978  Japan .
53-53233   5/1978  Japan .
55-151687 11/1980  Japan .
56-8731    1/1981  Japan .

Primary Examiner—Joseph F. Peters, Jr.
Assistant Examiner—Charles R. Watts
Attorney, Agent, or Firm—Lyon & Lyon

[57] ABSTRACT

A radiator system for motorcycles including a radiator mounted on the front of the motorcycle frame such that the filler cap affixed to the top of the radiator filler tube is located within a chamber in the front of the motorcycle frame and is enclosed within said chamber by means of a pair of perforated cover plates detachably mounted on each side of the motorcycle frame.

5 Claims, 4 Drawing Figures

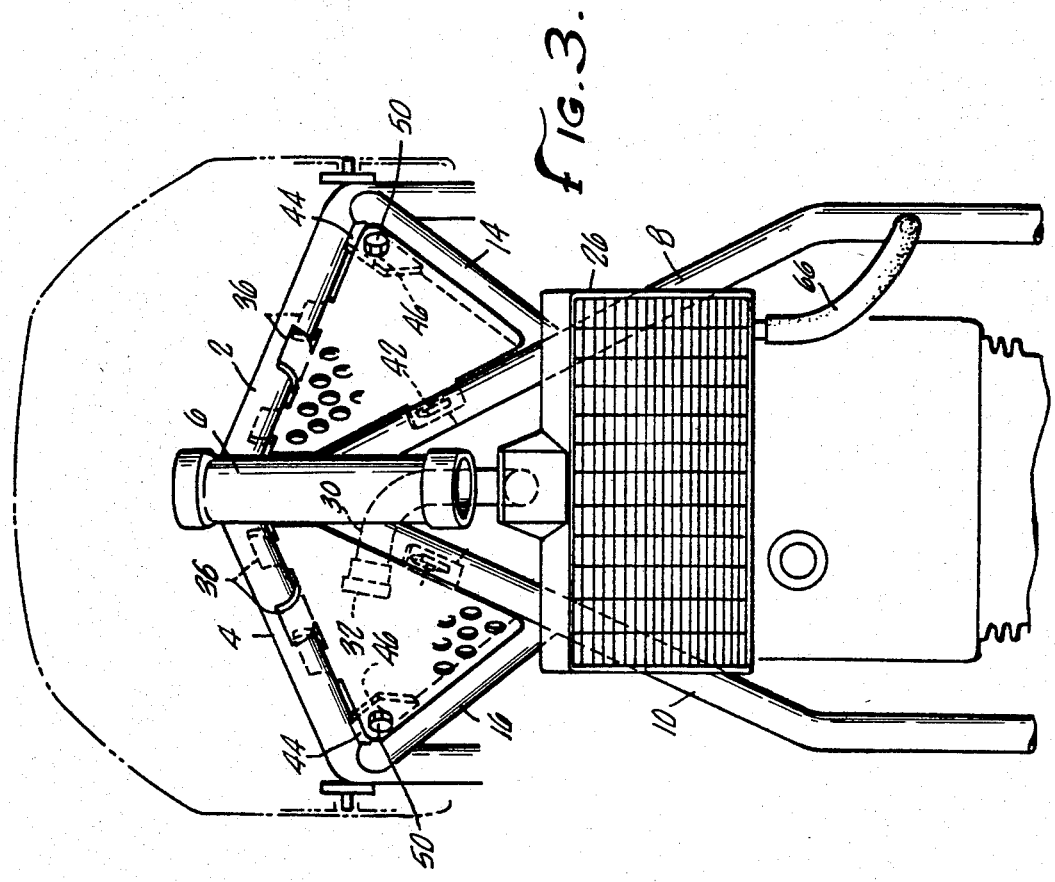
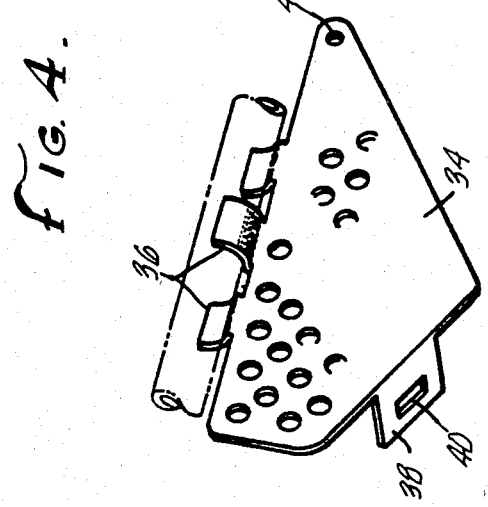

RADIATOR SYSTEM FOR MOTORCYCLE

BACKGROUND OF THE INVENTION

This invention relates to the field of radiator systems for motorcycles.

Conventionally, on a liquid cooled motorcycle, the filler cap and upper end of the radiator filler tube are exposed in the front of the motorcycle frame. Experience has shown that this exposure facilitates the theft or tampering with of the filler cap when the motorcycle is left parked and unattended. Since the operation of the motorcycle with the filler cap missing or not properly tightened is undesirable a need exists for a radiator system for motorcycles wherein the radiator filler tube and filler cap are secured from undesired removal or tampering.

SUMMARY OF THE INVENTION

The present invention is directed to a motorcycle cooling system. The cooling system employs a radiator mounted on the front of the down tube section of the motorcycle frame. The radiator filler tube extends upward from the top-rear of the radiator with the upper end of the filler tube being located within a chamber bounded by the upper frame section and the down tube sections of the motorcycle frame. The filler cap is attached to this upper end of the filler tube. The chamber is enclosed by means of a pair of cover plates, rotatably mounted on each side of the upper frame section and attached to the down tube section. The plates are locked in place by means of threaded bolts which are inserted through the wall of the plates and screwed tightly into support plates located within the chamber.

The motorcycle cooling system thus defined provides for a secure housing area for the filler cap on a motorcycle radiator This provides for the decreased likelihood of theft or tampering with the filler cap.

In view of the foregoing, a principal object of the instant invention is to provide a motorcycle radiator system free from undesired access to the filler cap. This and other and further objects will be apparent from the accompanying description and drawings.

BRIEF DESCRIPTION OF THE DRAWINGS

FIG. 3 is a partial front view of the embodiment of FIG. 1.

FIG. 4 is a perspective view of the chamber cover plate.

DETAILED DESCRIPTION OF THE PREFERRED EMBODIMENT

Figure 1:
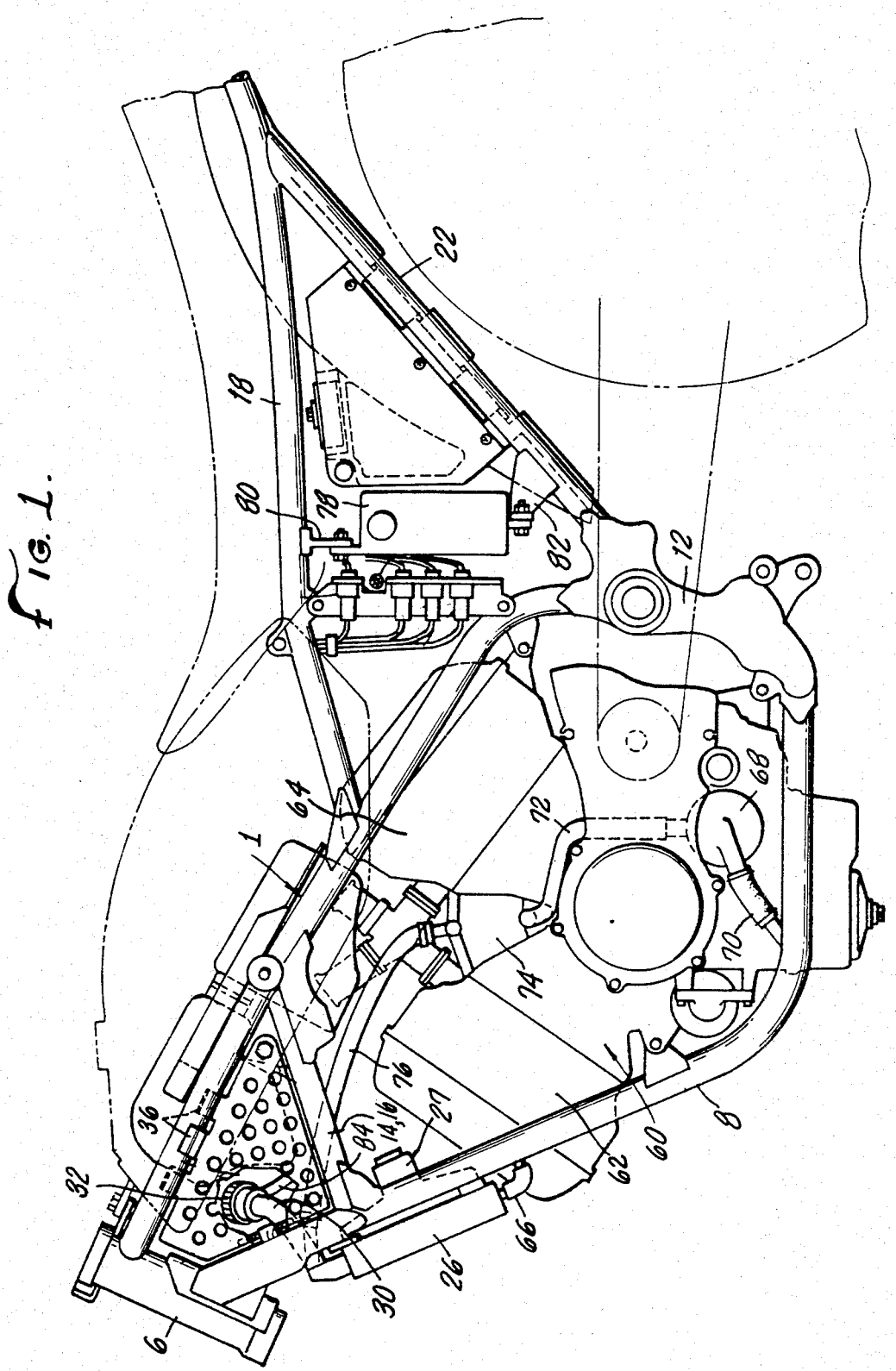
FIG. 1 is a side view of the instant invention as mounted on a mbtorcycle.
Figure 2:
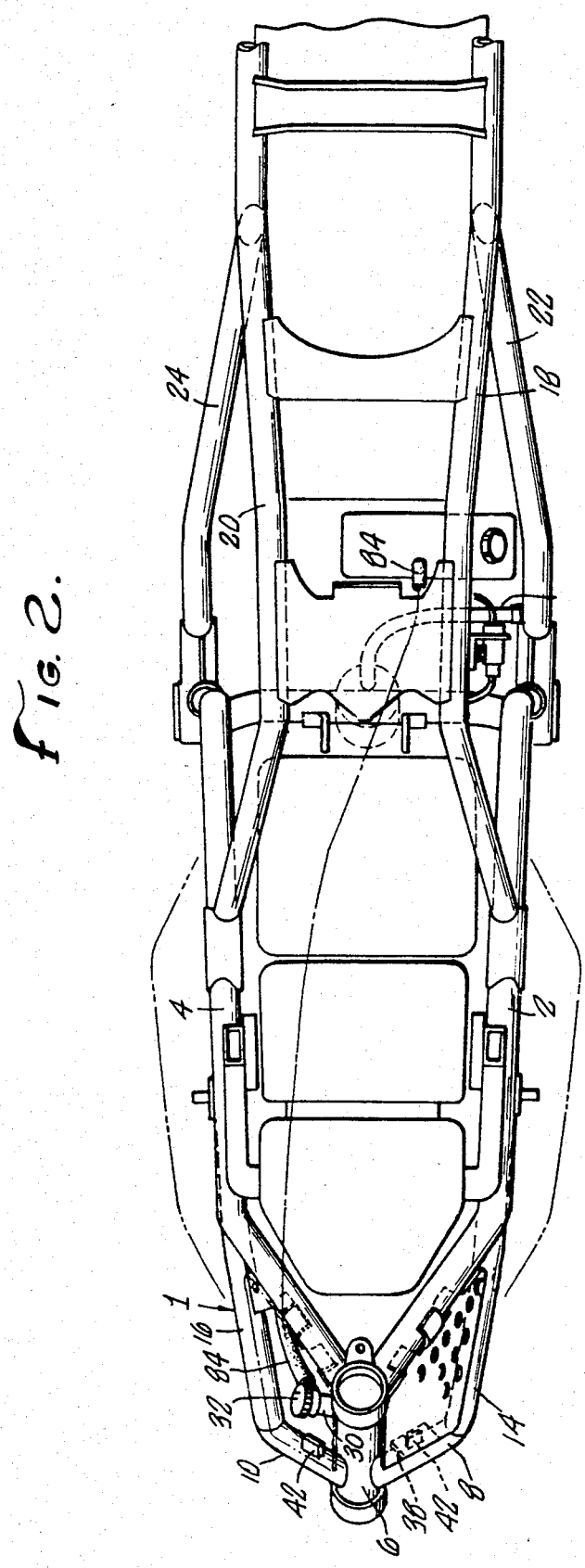
FIG. 2 is a top view of the embodiment of FIG. 1.

The invention as mounted on a motorcycle is shown in FIGS. 1, 2 and 3. The motorcycle body frame 1 is of the double cradle type. A pair of left and right main frame tubes 2, 4 are connected at their front ends to the upper portion of a head pipe 6. A corresponding pair of left and right down tubes 8, 10 are connected at their front ends to the lower portion of the head pipe 6. Main frame tube 2 and downtube 8 are connected at their rear ends by means of a center pillar 12. Similarly, main frame tube 4 and down tube 10 are connected at their rear ends by means of the center pillar 12. The stability of each loop formed by the joining of the main frame tubes 2, 4 and the down tubes 8, 10 is enhanced by means of front stays 14, 16 which connect the main frame tubes and the down tubes at intermediate points as shown in FIG. 3.

Left and right seat rails 18, 20 are attached at the front ends to main frame tubes 2, 4 and supported by left and right rear stays 22, 24 which are attached at their upper ends to seat rails 18, 20 and at their lower ends to center pillar 12.

The radiator 26 is mounted on the front of the down tubes 8, 10 as shown in FIG. 3. The radiator filler tube 30 extends upward from the rear of the radiator 26. The end of the filler tube 30 is located within the chamber defined by main frame tubes 2, 4 on the top, the down tubes 8, 10 in the front, the respective main frame tube, down tube and front stay combination on each side. A filler cap 32 is attached to the end of the filler tube 30. A fan assembly 27 is mounted behind the radiator 26 as shown in FIG. 1.

Cover plates 34 are attached to the motorcycle frame on each side of the chamber. The cover plate is shown in FIG. 4. The configuration of the cover plate 34 matches that of the plane created by the interconnection of the main frame 2, 4, the head pipe 6, the down tube 8, 10 and the front stays 14, 16. In the preferred embodiment the cover plate is perforated and is molded from any suitable synthetic resin. A plurality of resilient holding flanges 36 are molded to the top of the cover plate 34. The holding flanges 36 are alternately spaced along the top of the cover plate 34 with each alternate flange being curved inwardly towards the center of the cover plate 34 such that any two adjacent flanges are curved inwardly in opposite directions, towards the center line of the cover plate 34 and each other.

The cover plates 34 are snapped on the main frame tubes 2, 4 and held in place by the holding flanges 36. The curved configuration of the holding flanges 36 conforms to the cylindrical configuration of the main frame tubes 2, 4 and allows the cover plate 34 to be rotated about the main frame 2, 4 to allow for access to the chamber.

The cover plate 34 is attached to the down tube section 8, 10 by means of an arm 38 which is molded on the lower front portion of the cover plate 34. The arm 38 extends at a right angle from the face of the cover plate 34 inward towards the chamber when the cover plate 34 is mounted in place. Passing through the arm 38 is a slot 40 which is inserted over a tab 42 located on the down tube sections 8, 10.

To insure that the cover plates 34 may not be opened or removed by undesired persons, each cover plate may be locked to the frame. This is accomplished by means of a locking plate 44 which is located in the corner formed by the intersection of the main frame tube 2, 4 and the upper end of the front stays 14, 16. The locking plate 44 is shown in FIG. 3. A threaded aperture 46 passes through the locking plate 44. The cover plate 34 has a corresponding aperture 48 which aligns with the threaded aperture 46 when the cover plate is properly in place. A bolt 50 is inserted through the cover plate and tightened in the threaded aperture 46 thereby securing the cover plate 34 to the locking plate 44, and preventing unwanted removal or tampering with the cover plate.

The present invention is used in conjunction with a motorcycle having a V-type water-cooled engine 60. The engine has a front engine block 62 and a rear engine block 64. The engine coolant circulates from the radiator 26 through the engine 60 and back to the radiator 26. Coolant exits the bottom of the radiator through a bottom coolant conduit 66 which connects the radiator 26 with the down tube section 8. The coolant flows through a passageway in the lower portion of the down tube section 8 and exits the down tube section which is connected to the water pump 68 by means of a lower water pump conduit 70. An upper water pump conduit 72 transports the coolant from the water pump 68 to the bottom of a water jacket 74. A return conduit 76 transports the coolant from the water jacket 74 back to the top of the radiator 26.

The present invention also utilizes a reserve tank 78 for the radiator 26. The reserve tank 78 is mounted between seat rail 18, and the rear stay 22, by means of upper bracket 80 and lower bracket 82. The reserve tank 78 is connected to the filler tube 30 by means of an overflow tube 84. The overflow tube 84 connects with the filler tube 30 within the enclosed chamber.

One embodiment of the present invention has been disclosed. While this embodiment and application of this invention has been shown and described, it would be apparent to those skilled in the art that many more modifications are possible without departing from the inventive concepts herein. The invention, therefore, is not to be restricted except in the spirit of the appended claims.

What is claimed is:

1. A radiator system for motorcycles comprising:
   a frame body having a main frame section and a down tube section;
   a radiator having a filling tube and filler cap which is attached to the upper end of the filling tube with said radiator being mounted on the down tube section such that the filler cap is located within a chamber bounded by the main frame section and the down tube section; and
   a pair of cover plates, detachably mounted, one on each side of the frame body between said main frame sections and said down tube sections thereby enclosing the filler cap within said chamber, said cover plates each consisting of a perforated plate having curved alternately spaced and oppositely facing holding flanges affixed to the top thereof and an arm located on the lower front edge of the cover plate mounted at a right angle and facing inward from the cover plate, said arm having a slot passing through the arm so as to accommodate a tab located on the down tube section.

2. A radiator system for motorcycles as in claim 1 wherein the cover plates are constructed from a synthetic resin.

3. A radiator system for motorcycles comprising
   a frame body having left and right main frame sections and left and right down tube sections, with the front ends of the sections being connected by means of a head pipe and intermediate points of the sections connected by left and right front stays;
   a radiator having a filling tube and filler cap attached to the upper end of said filling tube, wherein said radiator is mounted in front of the left and right down tube sections in such a manner that the filler cap is located within a chamber bounded by the main frame section, head pipe, down tube section and front stays;
   a pair of cover plates, detachably mounted on each side of the frame body between said main frame sections, down tube sections and front stays wherein the cover plates each consist of a perforated plate having curved, alternately spaced and oppositely facing holding flanges affixed to the top thereof and an arm located on the lower front edge of the cover plate mounted at a right angle and facing inward from the cover plate, said arm having a slot passing through the arm so as to accommodate a tab located on the down tube section; and
   a locking means comprising a locking plate mounted at the junction of the main frame section and down tube section and a bolt wherein the locking plate has a threaded aperature which is aligned with a locking aperture in the cover plate such that the bolt may be inserted through the locking aperature and threaded into the locking plate and tightened thereby securing the cover plate to the frame body.

4. A radiator system for motorcycles as in claim 3 wherein the cover plates are constructed from a synthetic resin.

5. A radiator system for motorcycles comprising:
   a frame body having a main frame section and a down tube section;
   a radiator having a filling tube and filler cap which is attached to the upper end of the filling tube with said radiator being mounted on the down tube section such that the filler cap is located within a chamber bounded by the main frame section and the down tube section; and
   a pair of cover plates, detachably mounted, one on each side of the frame body between said main frame sections and said down tube sections thereby enclosing the filler cap within said chamber, said main frame section and said down tube sections being connected at intermediate points by means of left and right front stays, said chamber being further bounded by said left and right front stays.

* * * * *